US012567994B2

(12) United States Patent
Kimber et al.

(10) Patent No.: US 12,567,994 B2
(45) Date of Patent: Mar. 3, 2026

(54) CAN-FD REDUNDANCY FOR HIGH AVAILABILITY INDUSTRIAL I/O SUBSYSTEMS

(71) Applicant: Schneider Electric Systems USA, Inc., Foxborough, MA (US)

(72) Inventors: Kevin Kimber, Yate (GB); Matthew Caperon, Worthing (GB)

(73) Assignee: Schneider Electric Systems USA, Inc., Foxborough, MA (US)

( * ) Notice: Subject to any disclaimer, the term of this patent is extended or adjusted under 35 U.S.C. 154(b) by 0 days.

(21) Appl. No.: 18/812,210

(22) Filed: Aug. 22, 2024

(65) Prior Publication Data

US 2026/0058843 A1     Feb. 26, 2026

(51) Int. Cl.
*H04L 12/40* (2006.01)

(52) U.S. Cl.
CPC .... *H04L 12/40189* (2013.01); *H04L 12/4013* (2013.01)

(58) Field of Classification Search
CPC .................. H04L 12/40189; H04L 12/4013
See application file for complete search history.

(56) References Cited

U.S. PATENT DOCUMENTS

| | | | | |
|---|---|---|---|---|
| 12,395,917 B1 * | 8/2025 | Masoomzadeh | ... | H04B 7/18513 |
| 2006/0101184 A1 * | 5/2006 | Hegarty | .............. | G06F 11/2007 |
| | | | | 710/307 |
| 2025/0307184 A1 * | 10/2025 | Molakaseema | .... | G05B 19/0428 |

FOREIGN PATENT DOCUMENTS

| | | | | |
|---|---|---|---|---|
| CN | 103490966 A | 1/2014 | | |
| CN | 103516571 A | 1/2014 | | |
| CN | 107070763 A | 8/2017 | | |
| CN | 119583330 A | * 3/2025 | ....... | H04L 12/40006 |
| WO | WO-2013113226 A1 | * 8/2013 | .............. | H04L 1/22 |

OTHER PUBLICATIONS

Extended European Search Report from EP Application 25193275.2, dated Dec. 8, 2025, 8 pages.

* cited by examiner

*Primary Examiner* — Jerry B Dennison
(74) *Attorney, Agent, or Firm* — Stinson LLP

(57) ABSTRACT

Controller Area Network with Flexible Data Rate (CAN-FD) system and method providing high availability, redundant process control I/O. A server device coupled to dual CAN-FD busses generates a SYNC message designating one of the dual busses as active and another one as backup. The server device transmits the SYNC message on the active bus and then immediately transmits the SYNC message on the backup bus. A client device coupled to the dual busses transmits process data frames on the busses in response to the SYNC message. Each of the process data frames includes a sequence number for the current communication cycle and indicates on which of the dual busses the process data frame is being transmitted.

22 Claims, 10 Drawing Sheets

| 7 | 6 | 5 | 4 | 3 | 2 | 1 | 0 |
|---|---|---|---|---|---|---|---|
| Active Bus | | | Sequence Number | | | | |

CAN-FD REDUNDANCY FOR HIGH AVAILABILITY INDUSTRIAL I/O SUBSYSTEMS

BACKGROUND

Controller Area Network (CAN) is a message-oriented multi-master protocol for quick serial data exchange and allows industrial automation devices, sensors, actuators, and the like from different manufacturers to communicate on a CAN bus. CANopen, which is built on top of the CAN protocol, is a device-independent and manufacturer-independent protocol for communication on the CAN bus and covers the upper five layers of the Open Systems Interconnection (OSI) reference model. CANOpen optionally controls bus traffic to some degree by use of the SYNC protocol and synchronous process data objects (PDOs).

With the SYNC protocol, a SYNC message is used to synchronize the sensing of inputs and the actuation of CANOpen devices. CANOpen uses PDOs for transmitting real-time data between devices. Synchronization in CANOpen is based on two time values, i.e., cycle period and synchronous window. The SYNC communication cycle period defines the rate at which SYNC messages are sent and synchronous window length defines the time in which PDO messages must be received and sent. Devices can then send PDOs to exchange real-time process data in response to the SYNC. The PDOs can be constrained so they can only be transmitted in a synchronous window length within the communication cycle period.

Controller Area Network with Flexible Data Rate (CAN-FD) is a data communication protocol similar to CAN but provides significantly greater data transfer speed. In CAN-FD, part of the frame can be transmitted at a higher baud rate, allowing for frames with larger payloads.

While there is a standard for redundancy on a CANOpen network, no such standard exists for redundancy on a CANOpen FD network. Moreover, the approach used for CANOpen redundancy is not suitable for use in all use cases, as it provides a managed approach to network redundancy, which reduces the deterministic operation of the network and makes bumpless fail-over in the event of bus failures problematic.

SUMMARY

Aspects of the present disclosure provide deterministic, predictable, and reliable communication on a CAN-FD network and achieve high availability and high performance communications in a redundant input/output (I/O) subsystem for process automation solutions. A CAN-FD network embodying aspects of the present disclosure further permits the use of multiple techniques for managing communications, timing scheduled access to the network, and managing dual CAN-FD busses for high availability, with fault detection and safeguards, and management of redundant devices for protection against hardware failures.

In an aspect, a method for providing a CAN-FD high availability, redundant process control I/O bus comprises generating a SYNC message by a server device coupled to dual CAN-FD busses. According to the method, one of the dual CAN-FD busses is designated an active bus and another one of the dual CAN-FD busses is designated a backup bus. The method further includes transmitting the SYNC message on the active bus and then immediately transmitting the SYNC message on the backup bus. The SYNC message begins a current communication cycle during which communication on the dual CAN-FD busses occurs, and the SYNC message indicates which of the dual CAN-FD busses is the active bus for the current communication cycle. The method also comprises transmitting one or more process data frames on the dual CAN-FD busses by a client device coupled thereto in response to the SYNC message. Each of the process data frames includes a sequence number for the current communication cycle and indicates on which of the dual CAN-FD busses the process data frame is being transmitted. The process data frame received first via either the active bus or the backup bus and having a correct sequence number is processed and the process data frame received later via the other of either the active bus or the backup bus and having the correct sequence number is deleted.

In another aspect, a CAN-FD system for providing high availability, redundant process control I/O comprises dual CAN-FD busses, a server device, and a client device. The server device is coupled to the dual CAN-FD busses and generates a SYNC message for beginning a current communication cycle during which communication on the dual CAN-FD busses occurs. The SYNC message designates one of the dual CAN-FD busses as an active bus and another one of the dual CAN-FD busses as a backup bus and also indicates which of the dual CAN-FD busses is the active bus for the current communication cycle. The server device transmits the SYNC message on the active bus and then immediately transmits the SYNC message on the backup bus. The client device is also coupled to the dual CAN-FD busses and transmits one or more process data frames on the dual CAN-FD busses in response to the SYNC message. Each of the process data frames includes a sequence number for the current communication cycle and indicates on which of the dual CAN-FD busses the process data frame is being transmitted. The process data frame received first via either the active bus or the backup bus and having a correct sequence number is processed and the process data frame received later via the other of either the active bus or the backup bus and having the correct sequence number is deleted.

Other objects and features of the present invention will be in part apparent and in part pointed out herein.

BRIEF DESCRIPTION OF THE DRAWINGS

FIG. 4 illustrates an example of a single data byte including a sequence number according to an embodiment.

FIG. 7 is a simplified diagram illustrating a CAN-FD network according to yet another embodiment.

FIG. 9 is a simplified diagram illustrating a CAN-FD network according to yet another embodiment.

Corresponding reference characters indicate corresponding parts throughout the drawings.

DETAILED DESCRIPTION

The features and other details of the concepts, systems, and techniques sought to be protected herein will now be more particularly described. It will be understood that any specific embodiments described herein are shown by way of illustration and not as limitations of the disclosure and the concepts described herein. Features of the subject matter described herein can be employed in various embodiments without departing from the scope of the concepts sought to be protected.

Figure 1:
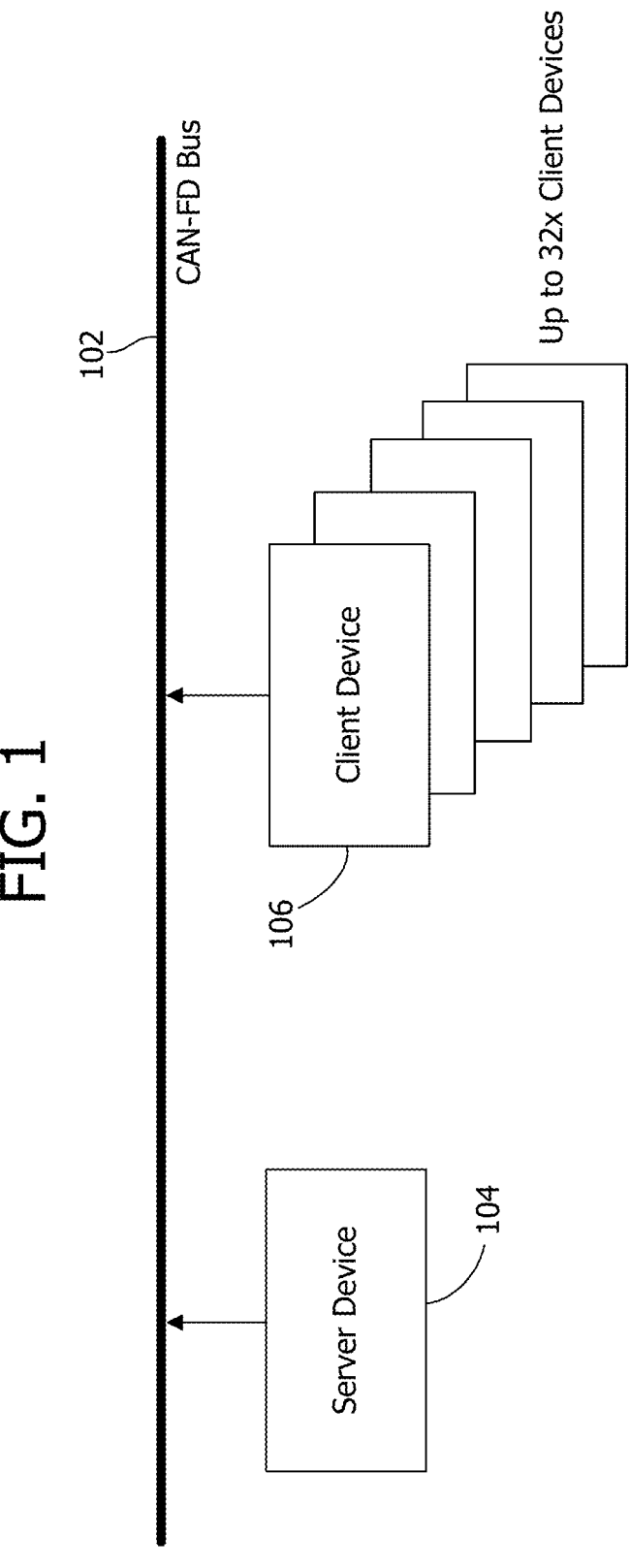
FIG. 1 is a simplified diagram illustrating a CAN-FD network according to an embodiment.

FIG. 1 illustrates a simplified network diagram in which principles from CANOpen-FD are improved for a synchronous communications model that provides time division on a CAN-FD bus 102 for full control of bandwidth. The illustrated network includes at least one server device 104 and a plurality of client devices 106 coupled to the CAN-FD bus 102. In an embodiment, the server device 104 controls access to and data flow on CAN-FD bus 102 and the client devices 106 respond to data requests from server device 104. As shown in FIG. 1, up to 32 client devices 106, for example are coupled to CAN-FD bus 102.

The server device 104 of FIG. 1 has complete control over CAN-FD bus 102 such that it only allows frames on the bus that are sent by server device 104 or are sent by client devices 106 in direct response to server transmissions. The server device 104 transmits a periodic SYNC frame on CAN-FD bus 102 that results in client devices 106 transmitting their process data (via PDOs) to server device 104. In an embodiment, a client device 106 always transmits at least one frame as a reply to the SYNC. After a specified period, server device 104 transmits its process data (via PDOs) to client devices 106. Upon completion of transmission of process data, server device 104 performs any required service data requests in the form of service data objects (SDOs).

Figure 2:
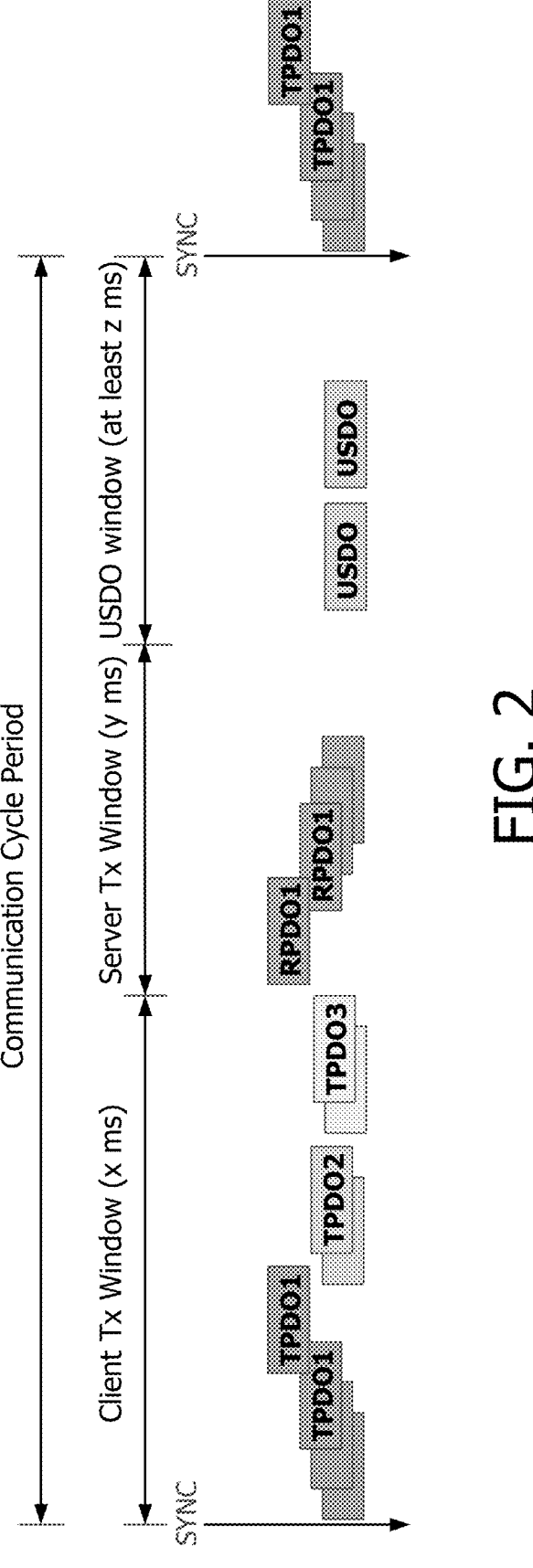
FIG. 2 illustrates an example of data communication on a CAN-FD bus of FIG. 1 according to an embodiment.

FIG. 2 illustrates an example of data communication on CAN-FD bus 102. As described above, a communication cycle period represents the duration between SYNC frames from server device 104. The client transmission window, Client Tx Window, represents the duration within the communication cycle period in which client devices 106 are allowed to transmit their process data (transmit PDOs, or TPDOs). Similarly, the server transmission window, Server Tx Window, represents the duration within the communication cycle period following the Client Tx Window in which server device 104 can transmit data back to the client devices 106 (receive PDOs, or RPDOs). The universal service data object (USDO) window represents the duration within the communication cycle period following the client and server transmission windows in which server device 104 can perform service data requests, i.e., USDOs.

In an embodiment, certain timing constraints may be imposed. For instance, the Client Tx Window is sufficiently large to allow for transmission of all process data from all client devices 106 and to allow some overhead for potential frame re-transmission in the event of bus errors. Similarly, the Server Tx Window is sufficiently large to allow for transmission of all process data to all client devices and to allow some overhead for potential retries.

Referring further to the client transmission window, aspects of the present disclosure maintain the initial state of the CAN-FD bus 102 as idle. When server device 104 transmits the SYNC frame, all client devices receive the SYNC frame and respond by immediately requesting transmission of the highest priority real-time data frame. In this instance, CAN arbitrations controls access to CAN-FD bus 102 by client devices 106 such that the CAN Frames having the lowest CAN ID are transmitted first. Upon successful transmission of a frame, the frame having the next highest priority gains access to the bus 102 and is transmitted. This repeats until all pending frames from all client devices 106 have been transmitted. CAN Bandwidth utilization according to an embodiment is near 100% and frames are transmitted as fast as CAN arbitration will allow. Enforced time division of the CAN-FD bandwidth in accordance with one or more embodiments, permits client devices 106 to only transmit in response to requests from server device 104, and only then during the defined transmission windows.

Upon successful transmission of its highest priority frame, a client device 106 queues any additional frame(s) it might have. These additional frames must have a lower priority than the high priority frames of the other client devices 106. This ensures that all client devices 106 can transmit their high priority data, before attempting transmission of lower priority data. CAN arbitration enforces this principle. All high priority frames are transmitted before any lower priority frames from any client device 106 are transmitted.

In accordance with one or more embodiments, server device 104 implements frame cancellation logic. Upon receipt of the SYNC frame from server device 104, client devices 106 note the time of receipt of the frame as the beginning of the Client Tx Window and start a timer to fire at the end of their Client Tx Window. Upon successful transmission of their high priority data frames by client devices 106, the timer is canceled. In the event the timer fires, it indicates the high priority frame was not transmitted successfully in the allotted time. This is deemed to be a major fault and handled by bus diagnostics. The client device 106 experiencing the fault requests immediate cancellation of the frame to free the bus 102 and prevent transmission during other timing windows.

With respect to lower priority traffic, upon successful transmission of high priority data, a client device 106 can transmit lower priority data by determining the remaining duration of the Client Tx Window, starting a timer to fire at the end of its Client Tx Window, and requesting transmission of the lower priority CAN frame. Upon successful transmission, client device 106 cancels the timer. In this instance, if the timer fires, the frame was not transmitted successfully in the time allowed and, again, this is deemed to be a major fault and handled by bus diagnostics. The client device 106 experiencing the fault requests immediate cancellation of the frame to free the bus 102 and prevent transmission during other timing windows.

In an embodiment, additional time can be added to the timing window to support possible frame retransmissions, for example. Thus, under ideal bus operating conditions, client devices 106 will complete transmission of all their data well within the client transmission timing window. If CAN-FD bus 102 is operating in a degraded state, the frame cancellation logic described above ensures that the bus 102 falls silent again at the end of the Client Tx Window.

Referring further to the server transmission window, after transmission of the SYNC frame, server device 104 waits during the Client Tx Window for process data frames from client devices 106. Following completion of the Client Tx Window, server device 104 transmits its process data in priority order under programmatic control such that upon completion of a frame transmit, the next priority frame is set for transmission. In this instance, there is no contention on bus 102 because only server device 104 has access to CAN-FD bus 102 during the Server Tx Window. Aspects of the present disclosure monitor bus health because errors on the bus 102 could cause retries, delaying frame transmissions. In other words, the only reason why server device 104 should not be able to transmit its process data is degraded CAN-FD bus health.

Upon completion of its process data, server device 104 begin its USDO transmission window, which varies based on time taken to transmit process data. In an embodiment, the USDO window length is determined based on the time remaining before the next scheduled SYNC, after transmitting the process data. The server device 104 must ensure there is adequate time remaining in the USDO transmit window for successful completion of the USDO request before the next schedule SYNC. During this window, server device 104 initiates and transmits any required USDO requests.

Aspects of the present disclosure permit reliable communications on a dual redundant CAN-FD network of up to, for example, 32 input/output (I/O) devices, and maximize bus utilization for reliable and high performance communications. A dual redundant CAN-FD network embodying aspects of the present disclosure further provides detection, fault management, and avoidance of communications failures due to CAN-FD bus faults as well as detection, fault management, and avoidance of loss of I/O due to hardware failures of I/O devices. It is to be understood that while aspects of the present disclosure utilize features of CAN-Open(-FD), they are not necessarily compliant with CAN-Open and should not be considered as an extension to CANOpen.

Figure 3:
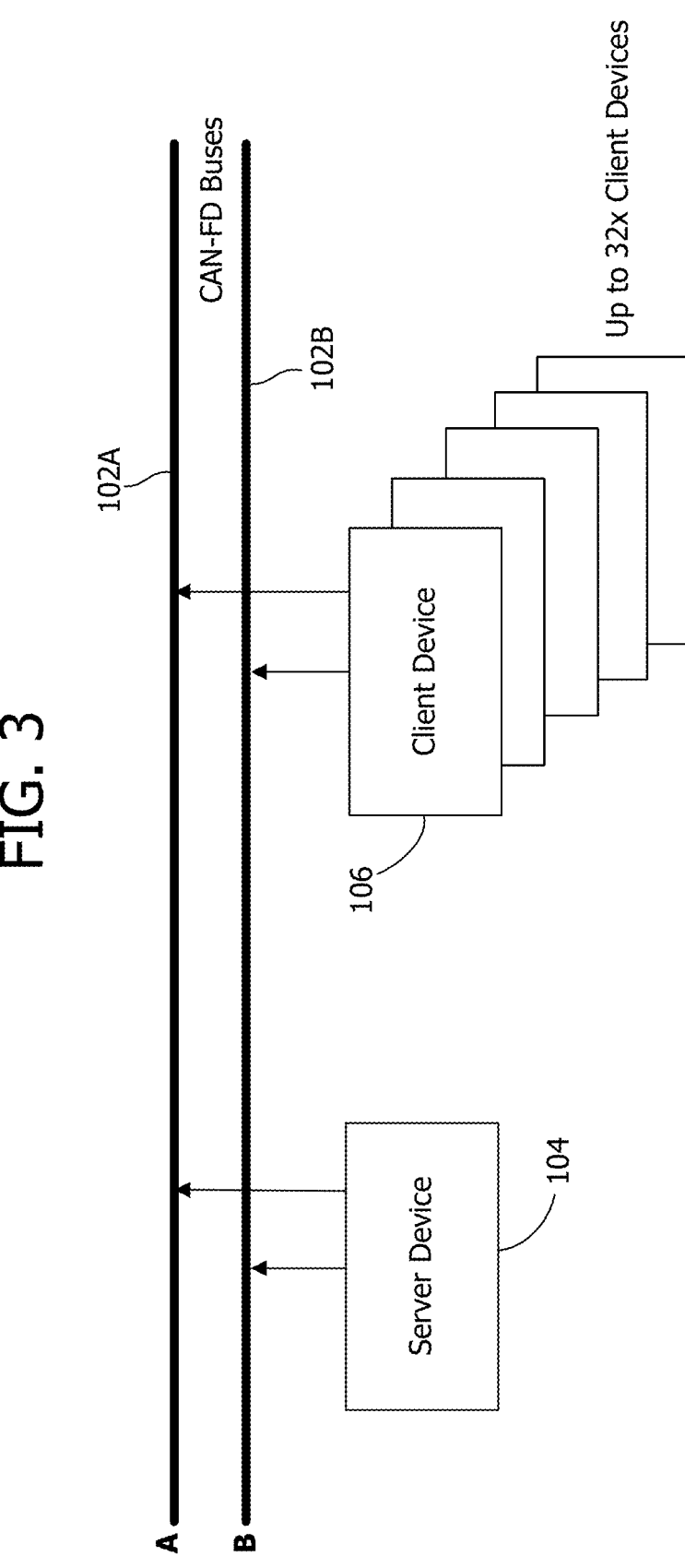
FIG. 3 is a simplified diagram illustrating a CAN-FD network according to another embodiment.

FIG. 3 illustrates a simplified network diagram according to another embodiment of the present disclosure. Similar to FIG. 1, the illustrated network includes at least one server device 104 and a plurality of client devices 106 coupled to a first CAN-FD bus 102A. In addition, server device 104 and client devices 106 are also coupled to a second CAN-FD bus 102B. As shown in FIG. 3, up to 32 client devices, for example are coupled to the first and second CAN-FD busses 102A, 102B. Aspects of the present disclosure provide CAN-FD bus redundancy to improve reliability of the bus for process data. In the illustrated embodiment, the two CAN-FD busses 102A, 102B improve the likelihood of process data being transported in a timely manner. In general terms, reliability is improved by transmitting all traffic on both CAN-FD busses 102A, 102B.

In an embodiment, server device 104 continually monitors bus health and determines which bus (i.e., CAN-FD bus 102A or CAN-FD bus 102B) is best and assigns this bus as the "active" bus. For instance, the active bus is considered the one that server device 104 determines has the best overall health and the secondary bus is the alternative bus to the currently selected active bus. From server device 104, every frame transmission has a timeout to allow for transmission on both busses 102A, 102B. If a frame fails to successfully transmit on either or both busses, the frame is canceled before another transmission can begin. The client devices 106 also support a transmission timeout, based on the Client Tx Window for process data, or a fixed timeout per frame for service data requests.

Each SYNC frame transmitted by server device 104 advantageously includes a single data byte, illustrated diagrammatically in FIG. 4. It is to be understood that the contents of the SYNC frame may be specific to this implementation. As shown, this byte contains two pieces of information: an active bus indication in the upper one bit of the data byte and a sequence number in the lower seven bits of the data byte. In an embodiment, bit clear indicates bus A (i.e., CAN-FD bus 102A) is the preferred/active bus and bit set indicates bus B (i.e., CAN-FD bus 102B) is the preferred/active bus, where bus A is the active bus by default. The sequence number provides identification of a specific SYNC cycle sent in the SYNC message and the high priority data frames. According to aspects of the present disclosure, the sequence number nominally increments by one on each SYNC cycle. A value of zero has a special meaning to client devices 106, forcing them to bypass normal SYNC number validation, accept the SYNC, and then reset their SYNC number validation logic.

Referring now to the frame transmit logic of server device 104, each frame transmitted by server device 104 has an associated timeout. The timeout is preferably hardcoded but is determined by the time taken to transmit the size of the frame on a CAN-FD bus, the latency between transmission on CAN-FD bus 102A and CAN-FD bus 102B, and any expected overhead from message processing (e.g., IRQ latencies etc.).

The transmission process in server device 104 sets a timer to expire based on the configured frame timeout, initiates transmission first on the current active bus and then, as quickly as possible, transmits the same frame on the secondary bus. Upon completion of transmission on both busses, the timer is canceled. If the timer fires, transmission of the frame is canceled on any bus that has no yet completed transmission of the frame. For server device 104, due to CAN-FD bus bandwidth control, it is expected that there is zero contention on the bus. In other words, CAN frames can be transmitted as desired, without being delayed due to CAN arbitration. It is important to note that successful frame transmission in CAN only means from the context of the transmitting device, that the frame was successfully acknowledged by another device. Successful frame transmission does not necessarily mean that the frame was successfully received by its intended recipient. The intent of transmitting on both CAN-FD busses 102A, 102B is to improve the likelihood that frames on at least one of the busses reaches the intended recipient. In an embodiment, there is minimal delay between transmitting on bus A versus transmitting on bus B as the SYNC message is transmitted first on the active bus and then immediately transmitted on the backup bus.

Referring now to the frame receive logic of client device 106, for SYNC frames, CAN-FD redundancy logic monitors for traffic on both busses, CAN-FD bus 102A and CAN-FD bus 102B. Both busses are considered equal from a receive perspective and frames are received of both busses in an interrupt context in which interrupts from bus A and bus B have the same priority, i.e., the first frame received that raises an IRQ is processed first. As server device 104 transmits on the active bus first, nominally it should be the frame on the active bus that is received and processed first. Upon receipt of a SYNC frame, client devices 106 extract the sequence number and active bus indication from the received SYNC. If the sequence number is ZERO, or if the sequence number is greater than the sequence number of the last received SYNC by ONE, the frame receive logic of client devices 106 will pass the SYNC frame up to the application and record the last received/processed sequence number. Upon receipt of a duplicate SYNC frame on the secondary bus, the frame receive logic determines whether the SYNC has already been processed by identifying whether the sequence number has already been processed and, if so, discards the frame.

Receipt of a SYNC frame causes client devices 106 to transmit their high priority process data. Each process data frame that is transmitted includes the sequence number of the current SYNC cycle and is set up for transmission on both the active and the secondary CAN-FD busses 102A, 102B. Transmission occurs first on the bus indicated as active by server device 104 (CAN-FD bus 102A, by default). Each frame that is transmitted has a timeout based on the Client Tx Window. If a frame has not been transmitted successfully on both bus A and bus B within the frame timeout, client device 106 will cancel frame transmission on any bus that has not yet completed transmission.

Aspects of the present disclosure also relate to high priority process data frame receive logic of the server device 104. The CAN-FD bus redundancy scheme according to one or more embodiments supports up to 32 client devices 106. The server device 104 maintains two 32-bit records, one for each bus as "lineStatus." Each bit in the record represents a receive status from a client device 106 (e.g., Client Device 0 is bit 0, Client Device 1 is bit 1, etc.). Upon receipt of a process data frame from a client device 106, server device 104 determines on which bus (CAN-FD bus 102A CAN-FD bus 102B) the frame was received and extracts the sequence number from the frame. The high priority process data frame receive logic sets a bit in the lineStatus for the specific bus and client device when the received sequence number matches the sequence number transmitted by server device 104. If the frame in question has not yet been received on another bus, the high priority process data frame receive logic passes the frame up to the application. On the other hand, if the frame has already been received on another bus, the high priority process data frame receive logic discards the frame. A similar process follows for all other lower priority process data frames to support receipt of process data off either CAN-FD busses. For other frames sent by each client device 106, server device 104 only accepts frames if they are received on the currently selected active bus. In this regard, server device 104 passes those frames received on the active bus and discards those frames received on the secondary bus.

Figure 5:
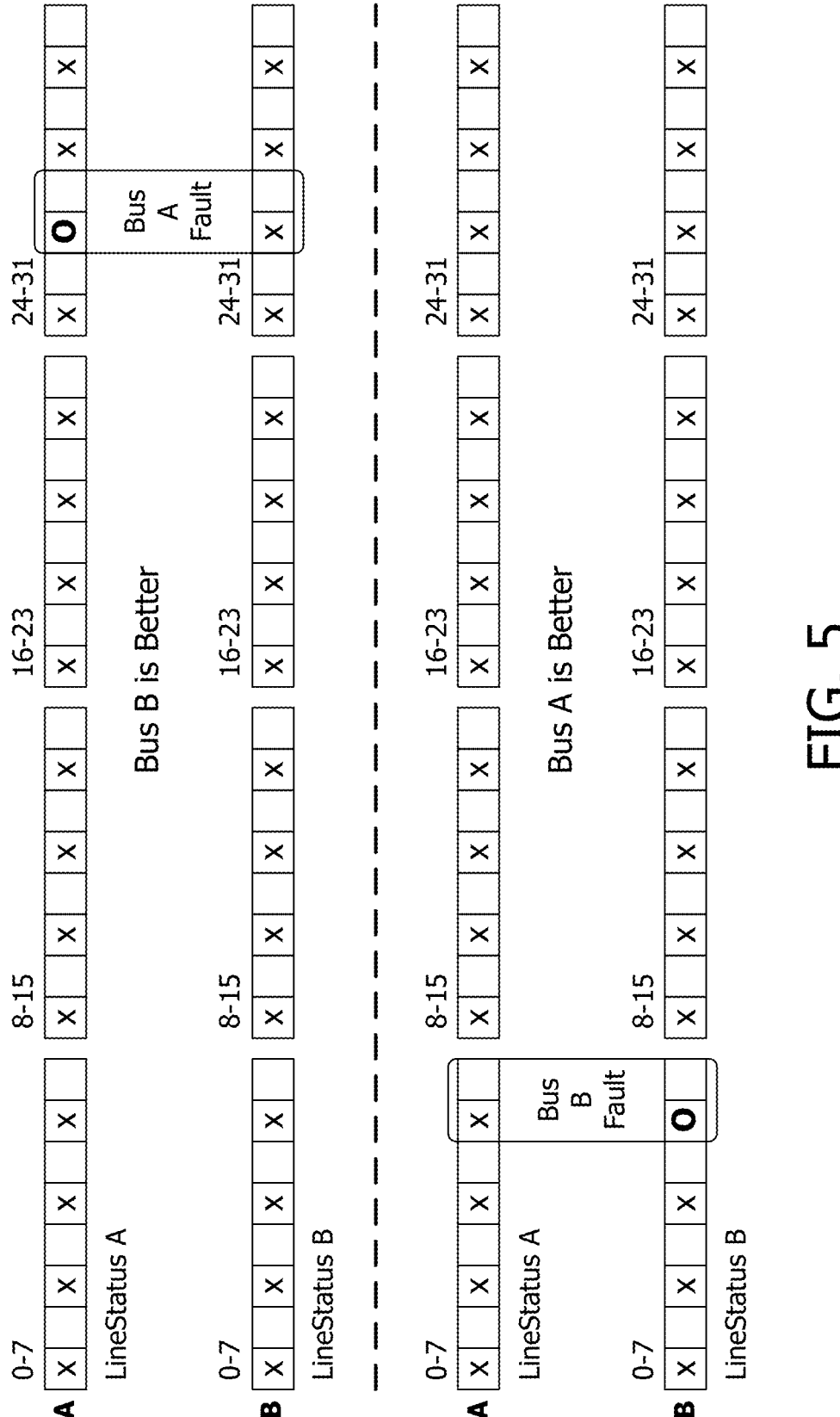
FIG. 5 illustrates an example of status monitoring on the CAN-FD busses of FIG. 3 to monitor bus health according to an embodiment.

FIG. 5 illustrates aspects of the present disclosure related to bus health monitoring. In an embodiment, server device 104 continually monitors bus health by monitoring the status of both CAN-FD bus 102A and CAN-FD bus 102B via error counters on the CAN controllers. For example, if the active bus is in an "Error" status but the secondary bus is "OK," the selection of which bus is active will switch. As shown in FIG. 5, server device 104 monitors the high priority process data replies sent by each client device 106 in response to a SYNC via "lineStatus." After completion of the Client Rx Window, if the count number of bits set in the lineStatus record for each bus is different, the bus with a lineStatus having the most bits that are set is considered "better" and is designated at the primary or active bus for the next SYNC cycle. Monitoring data contained in the high priority process data frames sent by client devices 106 reveals that these frames include: an indication if the previous SYNC frame was received on either bus A and/or bus B; an indication of which bus the client device 106 believes is the active bus; and an indication of the "error" state of the CAN controllers associated with bus A and bus B.

Figure 6:
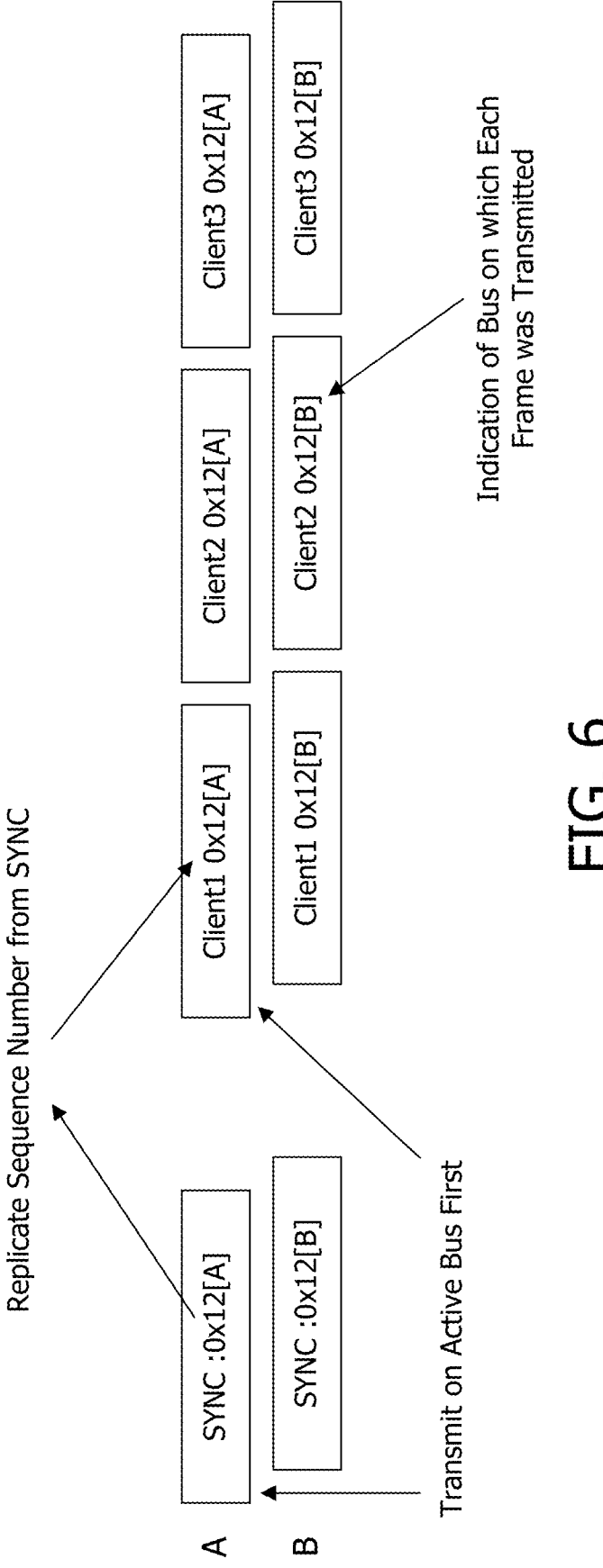
FIG. 6 illustrates an example of using sequence numbers to detect crossed connections on the CAN-FD busses of FIG. 3 according to an embodiment.

FIG. 6 illustrates aspects of crossed bus detection in accordance with one or more embodiments. As server device 104 determines the health of each bus 102A, 102B by the data it receives from client devices 106, it is imperative that both server device 104 and client devices 106 have all of their bus A and bus B connections matching. If any device or devices has its connections swapped (bus A connected to B), then the health detection algorithms will not work properly. To mitigate the risk of crossed busses, the high priority process data frames sent by client devices 106 include an indication of the bus on which they were transmitted (with respect to client device 106). On receipt of these frames by server device 104, the server will check that the bus the frame was received on matches the transmit bus indication in the frame itself. A mismatch is considered a high priority error and is flagged to the user for immediate correction.

Figure 7:
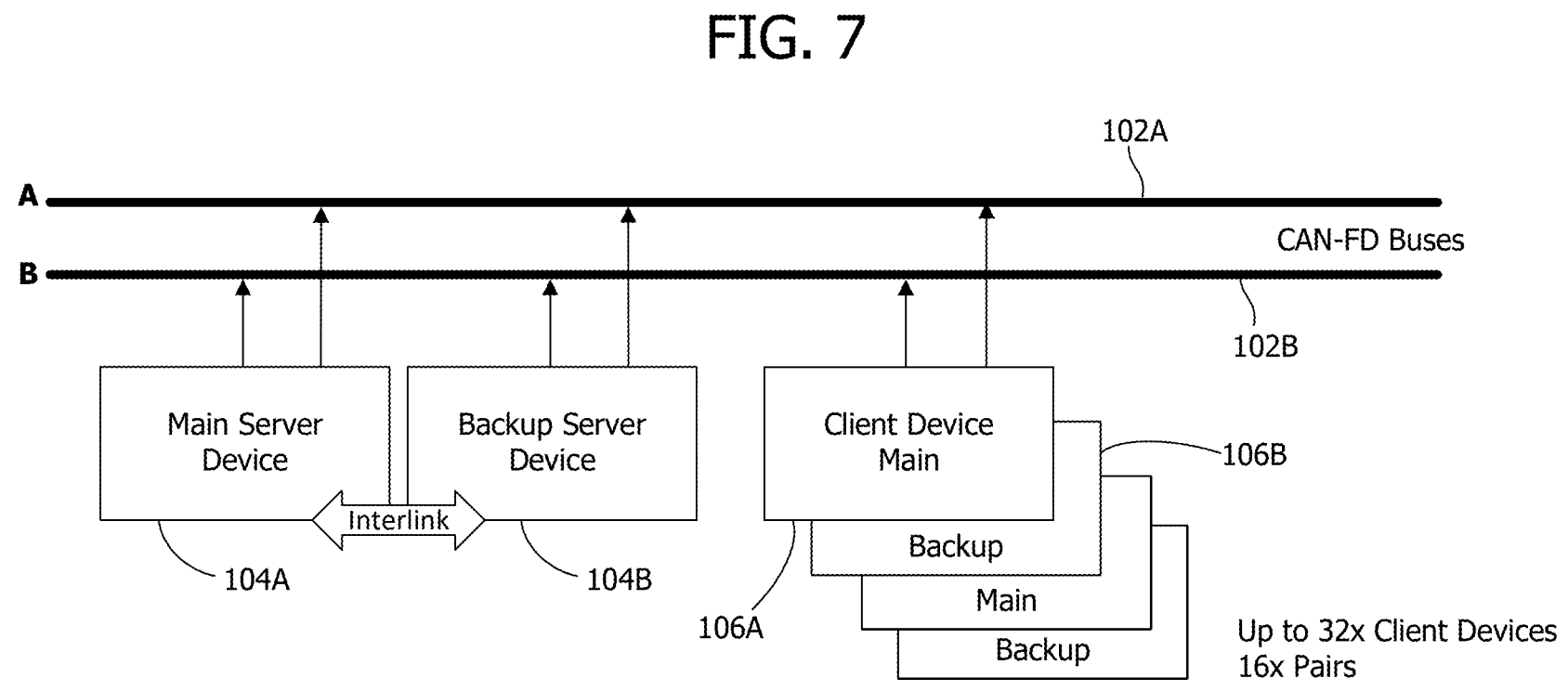

FIG. 7 illustrates further aspects of the present disclosure relating to device redundancy, namely, redundant CAN-FD communications for redundant devices. In the illustrated embodiment, a main server device 104A and a main client device 106A are default active devices and currently actively performing communications. A backup server device 104B and a backup client device 106B are default tracking devices configured to track the respective active device and monitor its operations. Moreover, the backup devices are configured to take over operation in the event the respective active device suffers a hardware fault or abnormal operation. For improved reliability, each device on the CAN-FD network has a backup. For instance, the backup server device 104B redundantly generates the SYNC message in the event of a fault in connection with the main server device 104A.

In an embodiment, the backup server device 104B is nominally silent on the CAN-FD busses 102A, 102B. The backup client devices 106B are configured to periodically transmit lower priority status information and do not transmit normal high priority process data. The main and backup devices continually exchange status information over interlinks as shown in FIG. 7. Although not shown in FIG. 7, it is to be understood that in addition to an interlink between server devices, there may also be interlinks between redundant client devices pairs. In the event status information indicates the backup (backup server device 104B and/or backup client device 106B) has better health than the respective main device (main server device 104A and/or main client device 106A), the backup will take over and become the active device. For this reason, main and backup devices continually monitor each other's activity on the CAN-FD busses 102A, 102B.

Figure 8:
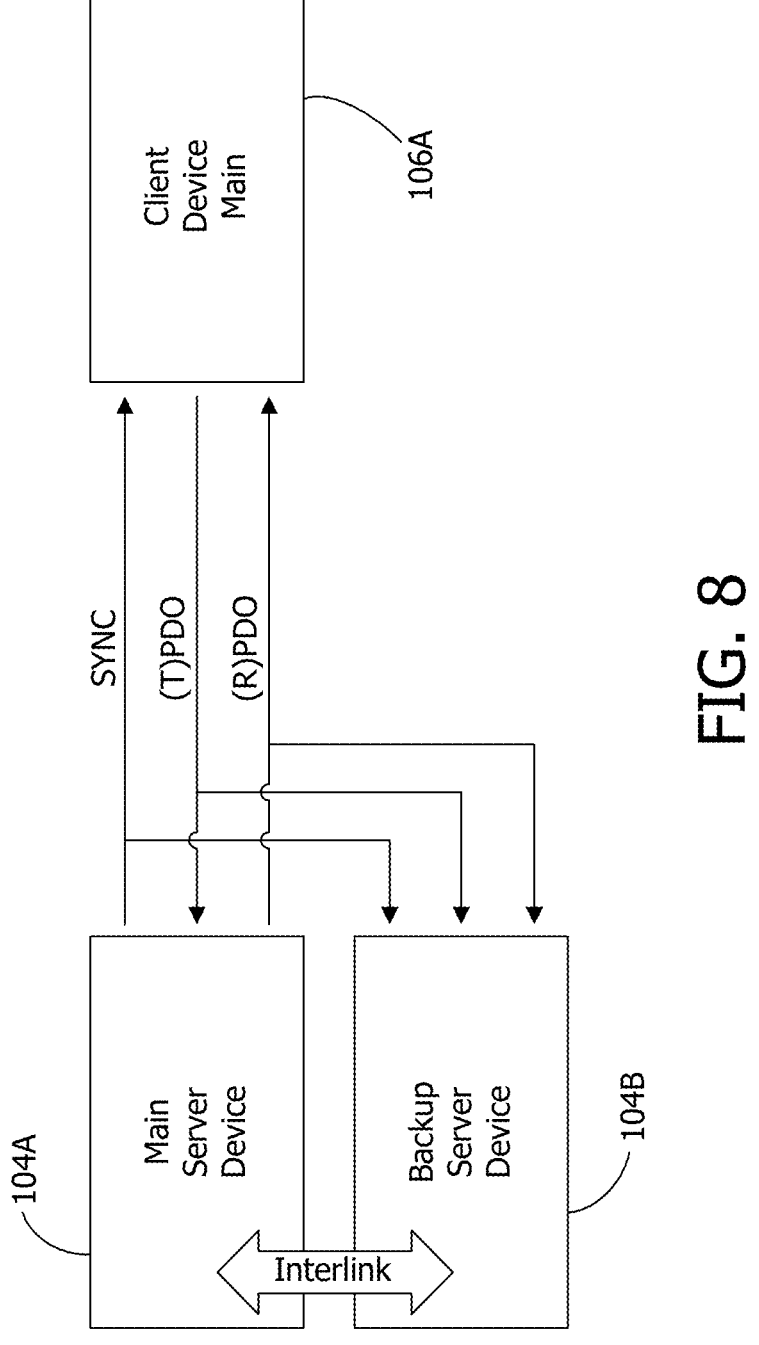
FIG. 8 illustrates server device redundancy according to an embodiment.

According to one or more embodiment, FIG. 8 illustrates further aspects of server device redundancy. From a CAN-FD perspective, most communication is effectively broadcast. Therefore, while the main (active) server device 104A is driving communications to client device 106, backup server device 104B is able to "snoop" on all of the communications. The backup server device 104B is therefore able to detect the start of a SYNC cycle by monitoring SYNC frames from main server device 104A, and is able to monitor the incoming process data coming from client devices 106, as well as the outgoing process data being sent to client devices 106.

Aspects of the present disclosure further permit CAN-FD status monitoring where both the main and backup server devices 104A, 104B continually monitor CAN-FD traffic, and independently determine the status of the CAN-FD network based on the frames they receive. The main and backup server devices 104A, 104B are configured to exchange their own view of the CAN-FD network status with their partner device over the interlink. If the there is a disagreement in the health of the CAN-FD network between the main and backup devices, whichever server device 104A, 104B that indicates it has the better health is configured to take over and become the active device. To prevent transient communications errors causing device failover, a hysteresis is applied to the health detection logic according to an embodiment.

As described above, backup server device 104B is nominally silent on the CAN-FD bus and primarily listens to communications from other devices. For this reason, it may not be readily known if backup server device 104B would be able to successfully take over operation from the active server device 104A should it become necessary (e.g. the transmit function backup server device 104B could be broken). To validate that the backup server device 104B is operating correctly, one or more embodiments employ a "Tracker Ping" mechanism. Accordingly, backup server device 104B periodically transmits a "Ping" frame and active server device 104A monitors for the presence of backup server device 104B on the network. If the active server device 104A is communicating with the backup server device 104B over the interlink, but the backup server device 104B is not "present" on the CAN-FD bus, then active server device 104A will not allow a failover to backup server device 104B, as it appears incapable of transmitting.

Figure 9:
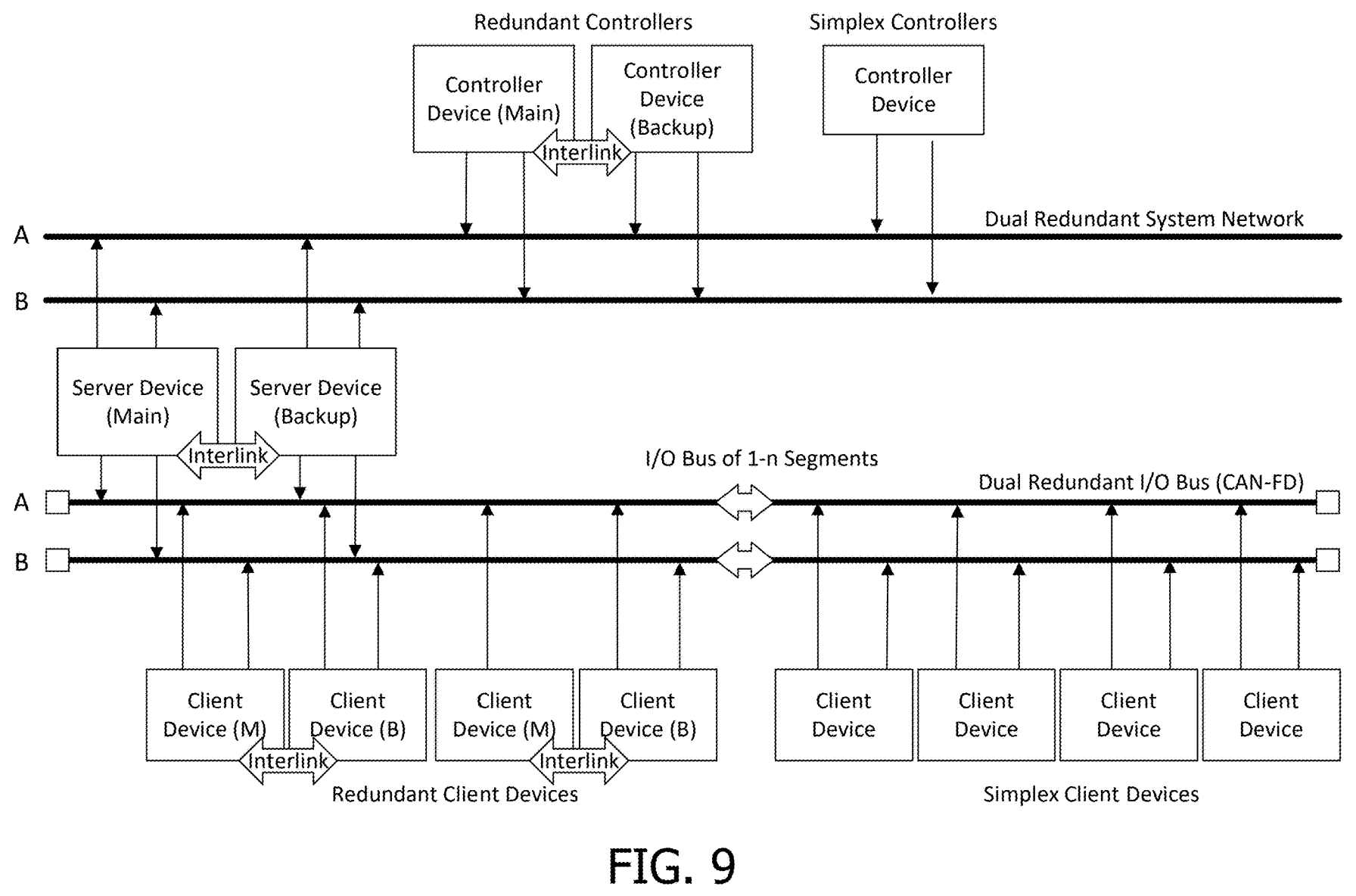

FIG. 9 further illustrates aspects of the present disclosure as described above with reference to FIGS. 7 and 8.

Aspects of the present disclosure permit reliable communications on a dual redundant CAN-FD network of up to, for example, 32 input/output (I/O) devices, and maximize bus utilization for reliable and high performance communications. A dual redundant CAN-FD network embodying aspects of the present disclosure further provides detection, fault management, and avoidance of communications failures due to CAN-FD bus faults as well as detection, fault management, and avoidance of loss of I/O due to hardware failures of I/O devices.

Aspects of the present disclosure provide deterministic, predictable, and reliable communication on a CAN-FD network and achieve high availability and high performance communications in a redundant input/output (I/O) subsystem. A CAN-FD network embodying aspects of the present disclosure further permits the use of multiple techniques for managing communications, timing scheduled access to the network, and managing dual CAN-FD busses for high availability, with fault detection and safeguards, and management of redundant devices for protection against hardware failures.

Figure 10:
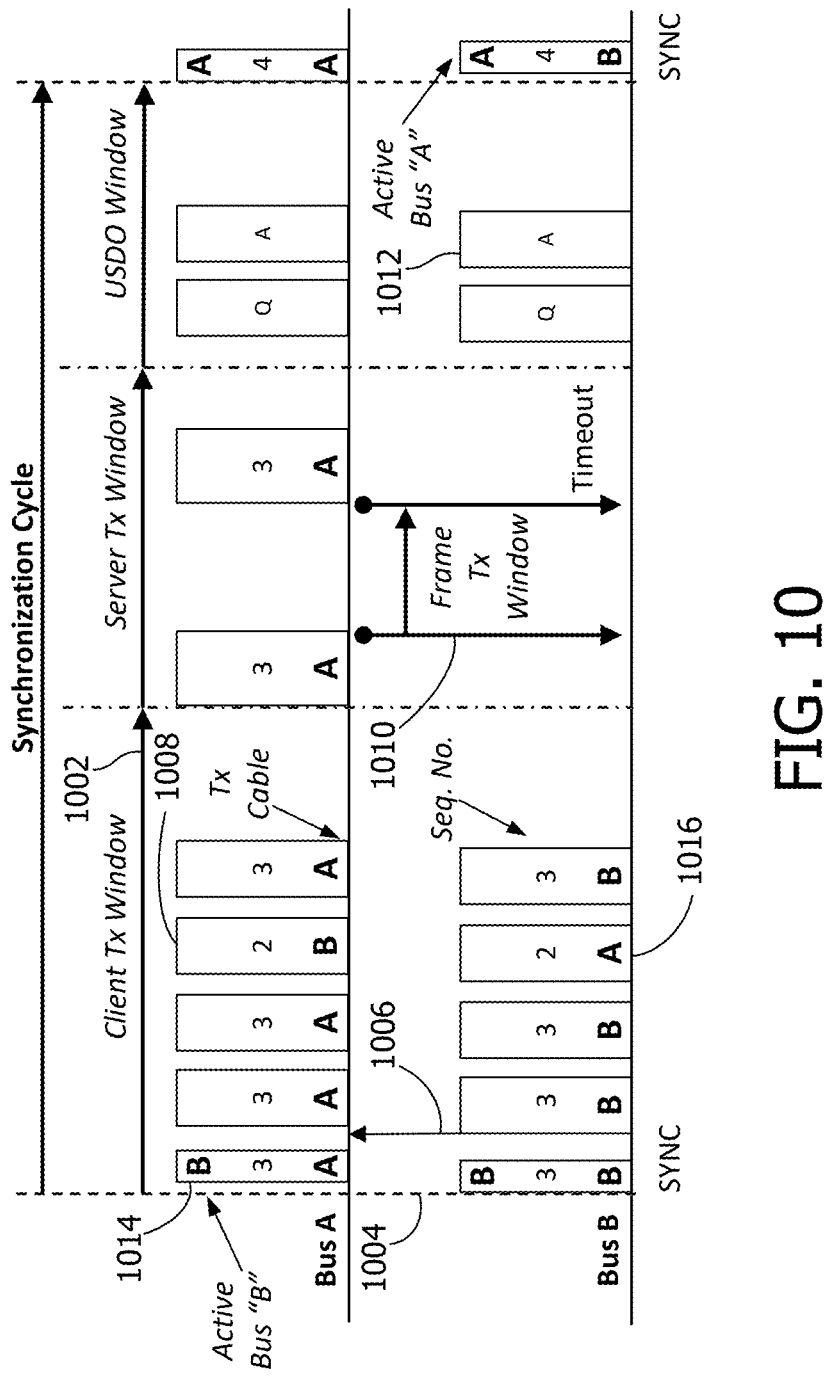
FIG. 10 is an example communication cycle illustrating high availability and redundancy for a process control I/O bus according to an embodiment.

Referring now to FIG. 10, a method embodying aspects of the present disclosure provides a CAN-FD high availability, redundancy design for a process control I/O bus. At 1002, the CAN-FD bandwidth is divided, or segmented, to ensure predictable access times to the CAN-FD bus(ses) and control CPU overhead of processing of CAN frames and, at 1004, all CAN-FD frames are transmitted on dual CAN-FD busses, including a unique sequence number for each synchronization cycle in every process data frame, along with an indication of the bus that the frame is being transmitted on. In an embodiment, one bus corresponds to an active CAN-FD bus and transmission begins on the active CAN-FD bus first before transmission begins a secondary CAN-FD bus. The method also includes, at 1006, processing the first frame having the correct sequence number received off either the active CAN-FD bus or the secondary CAN-FD bus, eliminating any duplicate frames received on either the active CAN-FD bus or the secondary CAN-FD bus having the same sequence number. The method further comprises, at 1008, eliminating any frames received with the incorrect sequence number, at 1010, transmitting on both the active CAN-FD bus and the secondary CAN-FD bus, one frame at a time, implementing a frame timeout should transmission fail to succeed on any bus before beginning transmission of the next frame, and, at 1012, allowing non-sequenced numbered USDO frames to be transmitted/received in a limited time window, only allowing receipt of USDO frames from the currently designated active CAN-FD bus. At 1014, the health of both the active CAN-FD bus and the secondary CAN-FD bus is determined on server device 104 from data received from client devices 106 in the previous synchronization cycle, including an indication of the nominated active CAN-FD bus in the SYNC frame transmission from server device 104 at the start of the synchronization cycle, allowing client devices 106 to switch to the active CAN-FD bus. At 1016, incorrectly wired CAN-FD networks (crossed cables) are detected by comparing the transmit bus indication in each process data frame with the bus the frame was received on.

In accordance with one or more embodiments, aspects of the present disclosure utilize time division on the CAN-FD bus 102 to control bandwidth, which supports controlling the load impact of CAN-FD traffic on, for example, low powered I/O devices. For instance, a periodic "Sync Cycle" (e.g., 20 ms) is implemented and divided into nominally three periods: a) where client devices 106 can transmit their process data; b) where server device 104 can transmit the latest process data to client devices 106; and c) where occasional service requests data can be processed. This provides improved predictability of bandwidth and helps to improve reliability of transfer of critical process data.

In addition, usage of dual CAN-FD busses 102A, 102B provides improved reliability in case of single faults and allows process data to continue to flow in the presence of both transient errors on either CAN-FD bus, or persistent errors on any one bus. All frames are transmitted on both CAN-FD busses 102A, 102B and each frame includes a sequence number to allow for error detection and elimination of duplicate frames. The dual CAN-FD busses 102A, 102B implement timeout handling to prevent delays in transmitting frames in the event transmission on any one bus fails and implement network fault detection methodologies to detect faults in the CAN-FD networks. The network fault detection beneficially allows for correct selection of which CAN-FD bus should be the primary, or active, bus for communications.

In accordance with one or more embodiments, aspects of the present disclosure also provide device redundancy. This approach allows for detailed network diagnostics to be created with minimal overhead, including reporting of crossed CAN-FD cables, transmission failures from any device, failure to receive frames on a bus, etc. Dual server devices 104A, 104B and dual client devices 106A, 106B (and so forth) are monitored for CAN-FD network status and provide for failover from the current active device to backup, or tracker, device when the backup has better connectivity than the active device. This provides near seamless continuous operation of process data transfers in the event a failover occurs. In other words, the core redundancy scheme enables redundant server devices 104A, 104B to be used, with bumpless failover of server devices.

Embodiments of the present disclosure may comprise a special purpose computer including a variety of computer hardware, as described in greater detail herein.

For purposes of illustration, programs and other executable program components may be shown as discrete blocks. It is recognized, however, that such programs and components reside at various times in different storage components of a computing device, and are executed by a data processor (s) of the device.

Although described in connection with an example computing system environment, embodiments of the aspects of the invention are operational with other special purpose computing system environments or configurations. The computing system environment is not intended to suggest any limitation as to the scope of use or functionality of any aspect of the invention. Moreover, the computing system environment should not be interpreted as having any dependency or requirement relating to any one or combination of components illustrated in the example operating environment. Examples of computing systems, environments, and/ or configurations that may be suitable for use with aspects of the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Embodiments of the aspects of the present disclosure may be described in the general context of data and/or processor-executable instructions, such as program modules, stored one or more tangible, non-transitory storage media and executed by one or more processors or other devices. Generally, program modules include, but are not limited to, routines, programs, objects, components, and data structures that perform particular tasks or implement particular abstract data types. Aspects of the present disclosure may also be practiced in distributed computing environments where tasks are performed by remote processing devices that are linked through a communications network. In a distributed computing environment, program modules may be located in both local and remote storage media including memory storage devices.

In operation, processors, computers and/or servers may execute the processor-executable instructions (e.g., software, firmware, and/or hardware) such as those illustrated herein to implement aspects of the invention.

Embodiments may be implemented with processor-executable instructions. The processor-executable instructions may be organized into one or more processor-executable components or modules on a tangible processor readable storage medium. Also, embodiments may be implemented with any number and organization of such components or modules. For example, aspects of the present disclosure are not limited to the specific processor-executable instructions or the specific components or modules illustrated in the figures and described herein. Other embodiments may include different processor-executable instructions or components having more or less functionality than illustrated and described herein.

The order of execution or performance of the operations in accordance with aspects of the present disclosure illustrated and described herein is not essential, unless otherwise specified. That is, the operations may be performed in any order, unless otherwise specified, and embodiments may include additional or fewer operations than those disclosed herein. For example, it is contemplated that executing or performing a particular operation before, contemporaneously with, or after another operation is within the scope of the invention.

When introducing elements of the invention or embodiments thereof, the articles "a," "an," "the," and "said" are intended to mean that there are one or more of the elements.

The terms "comprising," "including," and "having" are intended to be inclusive and mean that there may be additional elements other than the listed elements.

Not all of the depicted components illustrated or described may be required. In addition, some implementations and embodiments may include additional components. Variations in the arrangement and type of the components may be made without departing from the spirit or scope of the claims as set forth herein. Additional, different or fewer components may be provided and components may be combined. Alternatively, or in addition, a component may be implemented by several components.

The above description illustrates embodiments by way of example and not by way of limitation. This description enables one skilled in the art to make and use aspects of the invention, and describes several embodiments, adaptations, variations, alternatives and uses of the aspects of the invention, including what is presently believed to be the best mode of carrying out the aspects of the invention. Additionally, it is to be understood that the aspects of the invention are not limited in its application to the details of construction and the arrangement of components set forth in the following description or illustrated in the drawings. The aspects of the invention are capable of other embodiments and of being practiced or carried out in various ways. Also, it will be understood that the phraseology and terminology used herein is for the purpose of description and should not be regarded as limiting.

It will be apparent that modifications and variations are possible without departing from the scope of the invention defined in the appended claims. As various changes could be made in the above constructions and methods without departing from the scope of the invention, it is intended that all matter contained in the above description and shown in the accompanying drawings shall be interpreted as illustrative and not in a limiting sense.

In view of the above, it will be seen that several advantages of the aspects of the invention are achieved and other advantageous results attained.

The Abstract and Summary are provided to help the reader quickly ascertain the nature of the technical disclosure. They are submitted with the understanding that they will not be used to interpret or limit the scope or meaning of the claims. The Summary is provided to introduce a selection of concepts in simplified form that are further described in the Detailed Description. The Summary is not intended to identify key features or essential features of the claimed subject matter, nor is it intended to be used as an aid in determining the claimed subject matter.

The invention claimed is:

1. A method for providing a Controller Area Network with Flexible Data Rate (CAN-FD) high availability, redundant process control input/output (I/O) bus, comprising:

generating a SYNC message by a server device coupled to dual CAN-FD busses, wherein one of the dual CAN-FD busses is designated an active bus and another one of the dual CAN-FD busses is designated a backup bus;

transmitting the SYNC message on the active bus and then transmitting the SYNC message on the backup bus, wherein the SYNC message begins a current communication cycle during which communication on the dual CAN-FD busses occurs, and wherein the SYNC message indicates which of the dual CAN-FD busses is the active bus for the current communication cycle; and transmitting one or more process data frames on the dual CAN-FD busses by a client device coupled thereto in response to the SYNC message, wherein each of the process data frames includes a sequence number for the current communication cycle, and wherein each of the process data frames indicates on which of the dual CAN-FD busses the process data frame is being transmitted; and wherein the process data frame received first via either the active bus or the backup bus and having a correct sequence number is processed and the process data frame received later via the other of either the active bus or the backup bus and having the correct sequence number is deleted.

2. The method of claim 1, further comprising implementing a frame timeout when transmission of a first process data frame of the process data frames fail on both of the dual CAN-FD busses before beginning transmission of a next process data frame of the process data frames.

3. The method of claim 1, further comprising deleting any of the process data frames having an incorrect sequence number received via either the active bus or the backup bus.

4. The method of claim 1, further comprising segmenting the current communication cycle into a first window during which the client device is permitted to transmit the process data frames and a second window during which the server device is permitted to transmit the process data frames.

5. The method of claim 4, wherein segmenting the current communication cycle comprises performing a time division of a CAN-FD bandwidth.

6. The method of claim 4, wherein segmenting the current communication cycle comprises further segmenting the current communication cycle into a third window during which non-sequence numbered universal service data object (USDO) frames are permitted to be transmitted or received via the active bus, the third window following the first and second windows.

7. The method of claim 1, further comprising determining health of both of the dual CAN-FD busses by the server device based on the process data frames received from the client device in a previous communication cycle.

8. The method of claim 7, further comprises switching the one of the dual CAN-FD busses designated the active bus and the other one of the dual CAN-FD busses designated the backup bus based on the determined the health thereof and transmitting a next SYNC message to begin a next communication cycle during which communication on the dual CAN-FD busses occurs, wherein the next SYNC message switches which of the dual CAN-FD busses is the active bus for the next communication cycle.

9. The method of claim 1, further comprising detecting incorrect coupling of the client device to the dual CAN-FD busses by verifying the process data frames are received on the active bus or on the backup bus as indicated in the process data frames.

10. The method of claim 1, wherein the server device comprises a main server device and further comprising redundantly generating the SYNC message by a backup server device coupled to the dual CAN-FD busses and interlinked with the main server device.

11. The method of claim 1, wherein the client device comprises a main client device and further comprising redundantly transmitting the process data frames by a backup client device coupled to the dual CAN-FD busses and interlinked with the main client device.

12. A Controller Area Network with Flexible Data Rate (CAN-FD) system for providing high availability, redundant process control input/output (I/O), comprising:

dual CAN-FD busses;

a server device coupled to the dual CAN-FD busses, the server device generating a SYNC message for beginning a current communication cycle during which communication on the dual CAN-FD busses occurs, the SYNC message designating one of the dual CAN-FD busses as an active bus and another one of the dual CAN-FD busses as a backup bus, the SYNC message further indicating which of the dual CAN-FD busses is the active bus for the current communication cycle, the server device transmitting the SYNC message on the active bus and then transmitting the SYNC message on the backup bus; and a client device coupled to the dual CAN-FD busses, the client device transmitting one or more process data frames on the dual CAN-FD busses in response to the SYNC message, each of the process data frames including a sequence number for the current communication cycle, and each of the process data frames indicating on which of the dual CAN-FD busses the process data frame is being transmitted; and wherein the process data frame received first via either the active bus or the backup bus and having a correct sequence number is processed and the process data frame received later via the other of either the active bus or the backup bus and having the correct sequence number is deleted.

13. The system of claim 12, wherein the current communication cycle comprises a frame timeout when transmission of a first process data frame of the process data frames fail on both of the dual CAN-FD busses before beginning transmission of a next process data frame of the process data frames.

14. The system of claim 12, wherein any of the process data frames having an incorrect sequence number received via either the active bus or the backup bus are deleted.

15. The system of claim 12, wherein the current communication cycle comprises a first window during which the client device is permitted to transmit the process data frames and a second window during which the server device is permitted to transmit the process data frames.

16. The system of claim 15, wherein the current communication cycle is segmented into the first and second windows based on a time division of a CAN-FD bandwidth.

17. The system of claim 15, wherein the current communication cycle further comprises a third window during which non-sequence numbered universal service data object (USDO) frames are permitted to be transmitted or received via the active bus, the third window following the first and second windows.

18. The system of claim 12, the server device determines health of both of the dual CAN-FD busses based on the process data frames received from the client device in a previous communication cycle.

19. The system of claim 18, wherein the server device switches the one of the dual CAN-FD busses designated the active bus and the other one of the dual CAN-FD busses designated the backup bus based on the determined the health thereof and transmits a next SYNC message to begin a next communication cycle during which communication on the dual CAN-FD busses occurs, the next SYNC message switching which of the dual CAN-FD busses is the active bus for the next communication cycle.

20. The system of claim 12, wherein the server device detects incorrect coupling of the client device to the dual CAN-FD busses by verifying the process data frames are received on the active bus or on the backup bus as indicated in the process data frames.

21. The system of claim 12, wherein the server device comprises a main server device and wherein a backup server device coupled to the dual CAN-FD busses and interlinked with the main server device redundantly generates the SYNC message.

22. The system of claim 12, wherein the client device comprises a main client device and wherein a backup client device coupled to the dual CAN-FD busses and interlinked with the main client device redundantly transmits the process data frames.

* * * * *